April 4, 1972  F. B. LEITZ  3,654,125
APPARATUS FOR ELECTRODIALYSIS OF ELECTROLYTES
EMPLOYING BILAMINAR ION EXCHANGE MEMBRANES
Original Filed Aug. 5, 1968  2 Sheets-Sheet 1
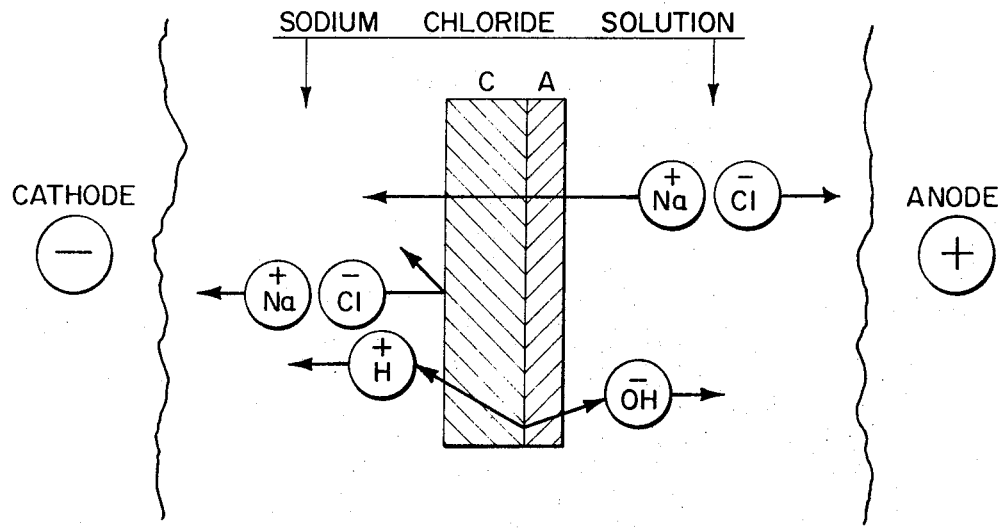
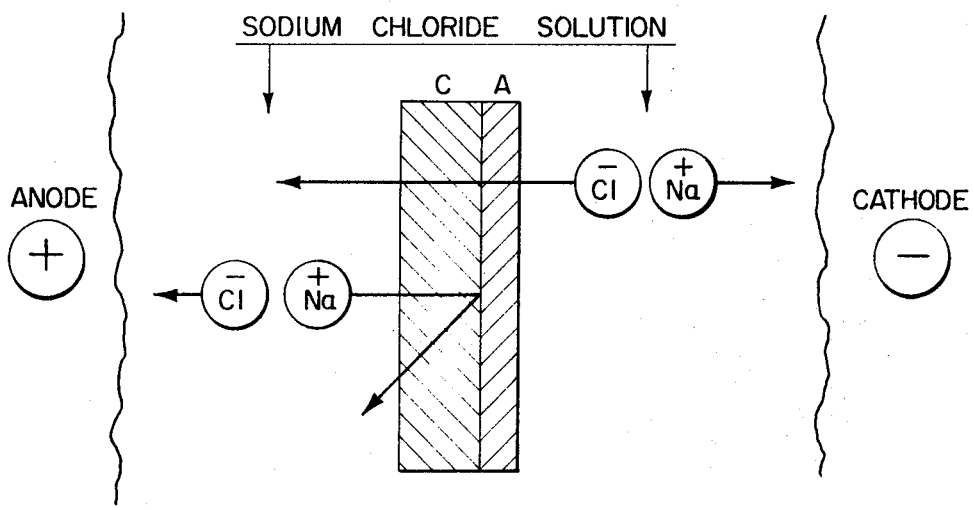
INVENTOR
FRANK B. LEITZ
BY Norman E. Saliba
ATTORNEY INVENTOR
FRANK B. LEITZ
BY Norman E. Saliba
ATTORNEY United States Patent Office 3,654,125
Patented Apr. 4, 1972

3,654,125
APPARATUS FOR ELECTRODIALYSIS OF ELECTROLYTES EMPLOYING BILAMINAR ION EXCHANGE MEMBRANES
Frank B. Leitz, Weston, Mass., assignor to Ionics, Incorporated, Watertown, Mass.
Original application Aug. 5, 1968, Ser. No. 750,312, now Patent No. 3,562,139, dated Feb. 9, 1971. Divided and this application Oct. 5, 1970, Ser. No. 77,976
Int. Cl. B01d 13/02; C02b 1/82
U.S. Cl. 204—301
3 Claims

ABSTRACT OF THE DISCLOSURE

Method and apparatus for the deionization of electrolyte solutions wherein alternatingly oriented anion-cation bilaminate ion-exchange membranes define the chambers of a multi-chamber electrodialysis cell and wherein the anion exchange laminae of each of said membranes bound the salt diluting chambers and the cation exchange laminae bound with the salt concentrating chambers. A direct electric current is passed transversely through all of said chambers and membranes which current is periodically reversed.

---

This application is a division of Ser. No. 750,312, filed Aug. 5, 1968 now U.S. Pat. No. 3,562,139.

This invention relates to a novel method and apparatus for removal of ionic constituents from an ionizing medium such as naturally occurring fresh, brackish and saline waters, industrial solutions, food, chemical and pharmaceutical solutions, sanitary and industrial effluents.

More specifically, the invention involves treatment in a novel multi-chamber electrodialysis cell of such an ionic solution which passes through said chambers under the impression of an direct electric current transversely therethrough, and wherein said chambers are defined by alternatingly oriented ion exchange membranes consisting of laminar membranes of composite cation and anionic character having a specified relationship to each other.

The invention is an improvement over electrodialysis presently performed whereby several of the major operational difficulties of present electrodialysis practice are avoided. For example, U.S. Pat. No. 2,863,813, issued on Dec. 9, 1958 to Juda et al., and U.S. Pat. No. 3,341,441, issued on Sept. 12, 1967 to Giuffrida et al., disclose methods and apparatus for the electrodialysis of aqueous solutions containing ionic constituents (salts) to be removed therefrom. The inventions disclosed in those patents are stated to overcome a previous known disadvantage of electrodialysis systems of the scaling or clogging and fouling of membranes, usually anion-exchange selective membranes, by substances present in the solution to be electrodialyzed and evidenced by a considerable increase of resistance of the membrane demineralizer over a period of time. The increase in resistance during the demineralization of the solutions is believed due to the precipitation, clogging and imbedding of the membranes by insoluble salts and/or organic medium molecular weight compounds which originate from the solutions being electrodialyzed. The operation and apparatus of Juda et al. and Giuffrida et al. patents required the use of alternating cation and anion selective membranes defining the chambers of the demineralizer and also the necessity of periodic cyclic reversal of the direction of the direct electric current. At the same time with each reversal the periodic interchanging of the flows of donor and donee solutions was required so that the concentrate chambers containing the waste stream became dilute chambers containing the process stream etc. The disadvantages of such practice are:

(1) Above polarization the concentrate stream becomes basic which leads to scaling of membranes due to formation of calcium carbonate and magnesium hydroxide;
(2) Adsorption of naturally occurring negatively charged ionic species which cannot pass through the anion selective membranes causes membrane fouling which results in an increase in electrical resistance. This fouling can be prevented by changing the direction of current flow as noted in the Juda et al. patent above but since this changes what was a dilute compartment to a concentrate compartment, and vice versa, the plumbing required to simultaneously interchange the donor and donee solutions becomes exceedingly complex, expensive, and often troublesome. The present invention overcomes all the disadvantages noted above in that:

(a) The concentrate stream is acidic in operation so that precipitation of carbonates and hydroxides in the concentrate stream is avoided;

(b) The location of the concentrate and dilute streams depends on the initial orientation of the membranes rather than on the direction of current flow which makes it possible to reverse current flow as often as is necessary without the necessity of simultaneously reversing the concentrate and dilute streams;

(c) No loss of treating solution or hold-up time is involved in the present system since there is no interexchange of the concentrating and diluting streams;

(d) Substantially reduced acid control of feed solution is possible since the present system tends to create an acid condition in the concentrate as well as in the cathode chambers of the previous reversal cycle.

These and other features of the invention will be more readily understood and appreciated from the following detailed description of a preferred embodiment of the invention selected for the purpose of illustration as shown in the accompanying drawings in which:

FIG. 1 is a diagrammatic elevational cross section of a simple cell showing a single composite cation-anion membrane with the direct current proceeding through said cell in one direction.

FIG. 2 shows the same simple cell of FIG. 1 with the direction (polarity) of the current in the opposite direction.

Figure 3:
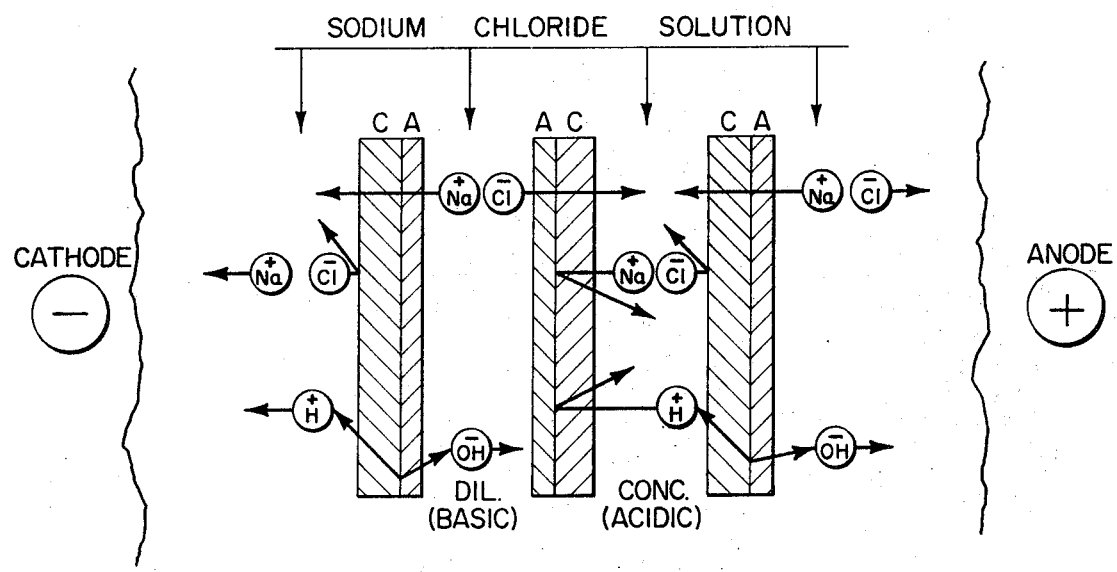
FIG. 3 is a schematic flow diagram of an assembly of alternatingly oriented composite ion exchange membranes in a cell with the direct electric current passing through said cell in one direction.

The process of the invention is dependent upon the unusual properties of certain unique types of laminar ion exchange membranes. Such membranes are depicted in the figures as cationic (C) on one face and anionic (A) on the other. The unusual properties of such laminar membranes may be observed for example in a Hittorf transport test cell. If current is passed in the direction shown in FIG. 1, where C and A indicate the cationic and anionic faces respectively, a substantial fraction of the current is carried by sodium ions ($Na^+$) (about 44%) "tunneling" through the anion selective resin and then passing through the cationic layer. The remainder (about 56%) is carried by hydrogen ions through the cation layer and by hydroxyl ions, moving in the opposite direction through the anion layer. These ions are apparently provided by the splitting of water molecules at the interface between the cation and anion regions. When the current flow is reversed as in FIG. 2, essentially the entire current is carried by chloride ions ($Cl^-$) (about 98%) passing through the anionic resin layer and then "tunneling" through the cation selective resin. This behavior appears to be due to the initial accumulation of both types of ions ($Na^+$ and $Cl^-$) at the interface between the resin regions which builds up to a concentration at which the Donnan exclusion of the cation resin is overcome. The laminar membranes of the present invention behave assymetrically, transferring mainly cations when the cationic lamina of the membrane faces the cathode and transferring mainly anions when the anionic lamina faces the cathode.

A possible explanation of the mechanism of the operation of such ion exchange membranes under the conditions shown in FIG. 1 is as follows:

Under the condition of current flow, anions are initially transferred out of the anion section of the membrane towards the anode, cations out of the cation section of the membrane toward the cathode. This transfer results rapidly in a depletion of mineral ions at the cation-anion resin interface in the membrane. If the electrical potential across the membrane is sufficiently large current will flow, carried by hydrogen ($H^+$) and hydroxyl ($OH^-$) ions from the ionization of water at the resin interface. The negative hydroxyl ions pass through the anion portion of the membrane towards the positive electrode and the positive hydrogen ions pass through the cation portion of the membrane towards the negative electrode. However, since the mobility of hydrogen ions is considerably greater (about 3 times) than that of hydroxyl ions, a greater potential gradient is set up across the anion membrane. This potential appears ultimately to result in a potential at the anion membrane-solution interface which overwhelms the Donnan exclusion force of the anion resin allowing sodium ions to pass into and through the anion portion of the membrane. In the steady state condition there results a transport of sodium ions from the anode to the cathode side of the membrane. It is to be noted that this particular process is not very efficient, approximately 50% current efficiency being observed with the membranes prepared so far.

Referring now to FIG. 2, when the direction of the current is reversed essentially the entire current is carried by the chloride ions. This is due initially to the accumulation of both types of ions ($Na^+$ and $Cl^-$) at the resin interface which build up to a concentration where the Donnan exclusion of the cation resin is overcome. The process is more readily understood in that the passage of current in the direction shown in FIG. 2 causes transport of chloride ions into the anion portion, and sodium ions into the cation portion, so that the concentration of sodium chloride at the cation-anion interface increases. In a very short time (apparently of the order of seconds) a concentration is reached at which the Donnan forces again are overcome, this time by concentration. In the preferred laminar membranes the Donnan exclusion forces of the cation resin are overcome so that the net steady state process is the passage of chloride ions through the entire membrane toward the anode. The breakdown of the Donnan exclusion forces by concentration is observed in the case of homogeneous membranes when the current efficiency decreases rapidly as the external concentration is increased above a certain value. The current efficiency of the process of FIG. 2, i.e., the transport of chloride ion, is very high (an experimental value of 98% was observed) while the transport of the hydroxyl ions ($OH^-$) toward the anode is much lower (an experimental value of about 2% was observed). In an electrodialysis cell using such laminar membranes arranged in alternating orientation one would expect an over-all current efficiency of about 75%.

Confirmation of the hypothesized cell behavior was obtained as follows:

A three compartment cell (cathode, middle and anode) employing silver-silver chloride electrodes was built with the compartments separated by oppositely oriented composite membranes produced as hereinafter described. Four permutation runs were made (two membrane orientations, two current directions). Using a silver nitrate titration (corrected for hydroxyl in the product) for determination of chloride, the following data were obtained.

TABLE

| | Chloride content (meq.) of middle compartment | | | Percent current efficiency | pH |
|---|---|---|---|---|---|
| | Initial | Final | Difference | | |
| Run No.: | | | | | |
| I | 1.098 | 1.241 | +0.143 | 64 | 2.0 |
| II | 1.124 | 1.240 | +0.066 | 66 | 3.0 |
| III | 1.140 | 1.074 | −0.066 | 66 | 11.3 |
| IV | 1.119 | 0.999 | −0.120 | 58 | 11.6 |

The runs in which the cationic resin faced the middle compartment (Runs I and II) showed an increase in concentration of chloride in the middle compartment regardless of the direction of the applied direct electric current. The runs in which the anionic resin faced the central compartment (Runs III and IV) showed a decrease in chloride in the central compartment regardless of current direction. Since the quantity of $H^+$ or $OH^-$ transported is only about ⅓ of the quantity of chloride, the majority of current carried by positive ions must have been carried by sodium ions. The pH changes are as predicted, the diluting compartment becoming basic and the concentrating compartment becoming acidic. Current efficiencies are roughly constant.

It has been found that the preferred laminar membranes suitable for the purposes of this invention have anion resin lamina which are substantially thinner (½ to ¼ or even less) than the cation resin lamina. Preferably the exchange groups in the anion resin should be predominantly quaternary ammonium or other strongly basic groups and the exchange groups in the cation resin should be predominantly sulfonate or other strongly acidic groups. Finally it was also found that the preferred internal molality of the cation exchange resin should be less (10 to 50 percent less or even more) than that of the anion resin. For purposes of this disclosure, the internal molality is defined as Internal molality $$= \frac{\text{milliequivalents of exchange capacity}}{\text{grams of gel water}}$$

Figure 4:
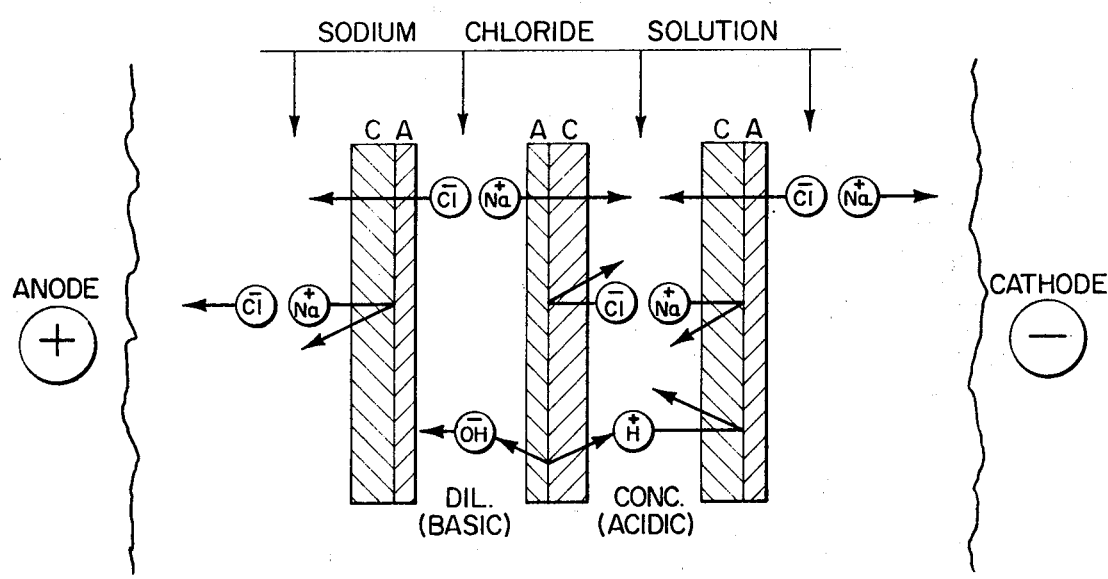
FIG. 4 is the cell of FIG. 3 with the direct electric current passing through the cell in the opposite direction.

If a group of such membranes is now assembled with alternating orientations as in FIGS. 3 and 4 the resulting electrodialytic process can be seen as indicated in the figures. The result of this operation is separation of a feed stream into a diluate (dil.) and a concentrate (conc.) stream. The only difference between the operation involved in FIGS. 3 and 4 is that the position of the anode and cathode have been switched, i.e., the current flow has been reversed. However, it will be noted that the position of the diluate and the concentrate streams have not been altered and will perform as shown in the drawings. The number of coulombs passed between current reversals should preferably be large in comparison to the membrane capacity. With membranes prepared in accordance with the procedures given below, it was found sufficient to pass 0.25 milliequivalent of current per square centimeter of membrane (25 ampere seconds or about 1000 seconds between reversals) this was about 10 times the areal membrane capacity (milliequivalents per square centimeter).

Many of the modes of construction presently employed in electrodialysis can be used. The aspects which are specific to this invention are use of the particular varieties of two ply laminar membranes described herein with respect to FIGS. 1 and 2, and the alternation of the orientation of the membrane faces in the stack in conjunction with the periodic reversal of the flow of electric current transversely across the chambers and membranes. It will also be clear, as fully shown in the drawings, that under the conditions set forth above there is no interchanging of the diluting and concentrating chambers which in all the prior art disclosures is required. In addition, the concentrating chambers remain acidic during the entire operation of the electrodialysis cell, thus preventing precipitation of alkaline earth compounds in such chambers.

Permselective ion exchange membranes, cationic and anionic, individually as well as laminar membranes are well known in the art. Such ion exchange membranes for example, are basically reinforced styrene-divinylbenzene copolymers which are then sulfonated (cation type) or aminated (anion type). Styrene-divinylbenzene copolymers with sulfonic ion exchange groups (cation type) are fully disclosed in the patent to Clarke, No. 2,731,411. Anion types for example, a styrene-divinylbenzene-vinyl pyridine membrane are fully disclosed in the patent to Juda et al. No. 2,860,097. Cationic and anionic membranes based on polyethylene-styrene copolymers are also known to be bonded together in a hydraulic press for example at about 150° C. and at a pressure of about 400 lb./sq. inch forming two ply membrane structures (Pat. No. 3,372,010). Laminar membranes prepared by such pressure bonding are effective in the apparatus of this invention particularly where the cation resin laminae have substantially lower internal molalities than the anion laminae.

Laminar permselective ion exchange membranes preferred in the electrodialysis system of the present invention may be prepared as follows: A sheet of polystyrenized polyethylene containing about 25% polystyrene is wrapped around the outside of a stainless steel cylinder which has previously been coated with an inert wax or grease to prevent penetration of the reagents to the concave side of the sheet. A piece of porous stainless steel sheet is wrapped around the cylinder on top of the polymerizate and held in place by a pair of clamps. This method of securing the polymerizate is used in order to maintain a firm pressure of the porous stainless steel over the entire surface of the polymerizate during activation. The assembly in then immersed in sulfonating reagents such as concentrated sulfuric acid, etc. A series of said polymerizates are reacted wherein the sulfonating time and/or sulfonating reagents are varied to obtain the proper predetermined depth of sulfonation. Electrical resistance is measured through all of the samples and it is found that up to a given period of time the resistance is very high after which there is a decrease in resistance with increasing sulfonation time. The treated board selected should be one which still retains a reasonably high electrical resistance but which also has been in the sulfonating bath for a considerable period of time. This will have a fairly deeply sulfonated layer one one side but at no point should the reacted portion reach all the way through the board. This depth of penetration may be verified and controlled by cutting the structure and dyeing the cut edge with methylene blue. The sulfonated portion will be heavily dyed. The partially sulfonated board section is removed from the stainless steel apparatus and placed in a chloromethylating bath completely covering both surfaces. Following chloromethylation the board is aminated in trimethylamine. After being equilibrated in 0.01 N sodium chloride solution the resistance of the membrane should be measured and will be found to be quite low, generally having a specific resistance of less than 500 ohm-cm. Usually the cationic side of the laminar membrane will be of tan color while the anionic side will be cream colored. Another expedient for identifying the sides is to place a few drops of a dilute solution of methylene blue at the corner of the membrane which will dye the cation exchange side but will not affect the anion side. Another expedient would be to test the membrane in the well known Hittorf transport cell. If no precautions are taken to indicate which side has been sulfonated, it will be necessary to test the membrane in such a transport cell and a comparison of the results with the hypothetical model membrane will identify the orientation.

The following specific examples are intended to illustrate more clearly the nature of the present invention without serving as a limitation upon its scope.

EXAMPLE I

For the manufacture of cation resin laminae, twenty sheets (each 12 by 13 inches) of 3 mil high-density polyethylene are suspended on a rack and immersed in a mixture of 1000 parts (by weight) of monostyrene, 10 parts of commercial 55% divinylbenzene and 10 parts of benzoyl peroxide. The temperature of the mixture is maintained at 70° C. The sheets are spaced at ¼-inch intervals on the rack and the mixture is violently agitated by withdrawing the mixture with a centrifugal pump from the lower half of one side of the tank containing the mixture and returning it through a strainer to the upper half of the opposite side of the tank. The sheets are removed after 6½ hours, drained and the excess monomer solution removed from the surface with absorbent paper, toweling, or squeegees. The sheets are placed individually between glass plates covered with aluminum foil which has been painted with a dilute solution of stearic acid in ethyl ether. (The sequence is: a glass plate; a piece of aluminum foil; a sheet of styrenized polyethylene; aluminum foil; glass plate; aluminum foil; styrenized polyethylene; aluminum foil, glass plate; etc.). The stack of glass plates, foil and polyethylene is weighted on top with lead bricks and heated in a recirculating hot air oven for about 17 hours. The resulting cured styrenized sheets are stripped from the foil, and soaked for 15 minutes in ethylene dichloride at room temperature. The loose polystyrene polymer on the surfaces of the sheets is brushed off while maintaining the sheets damp with ethylene dichloride. The sheets are again rinsed in ethylene dichloride, mounted on stainless steel racks and immersed in 98 percent (by weight) sulfuric acid (containing 0.1 percent by weight of silver sulfate) at 50° C. for 3 hours, then removed, allowed to cool briefly, immersed at room temperature for 15 minutes each in sequence in 75% sulfuric acid, 50% sulfuric acid, 25% sulfuric acid, 10% sulfuric acid, 10% sodium chloride and distilled water.

For the preparation of anion resin laminae, the above styrenization procedure is repeated using 1-mil high-density polyethylene film. Instead of immersing in sulfuric acid, the styrenized sheets are immersed for 7 hours at room temperature in chloromethyl ether containing 20 percent by weight of anhydrous ferric chloride, then removed and rinsed twice (15 minutes each time) in ethylene dichloride, twice in methanol and then soaked for 17 hours in 30 percent by weight of trimethylamine. The sheets are then immersed successively (15 minutes each time) in 35% hydrochloric acid, 18% hydrochloric acid, 3.5% hydrochloric acid, 10% sodium chloride and distilled water.

The resulting anion and cation laminae are then dried in air at room temperature for 24 hours. A sheet of anion resin is placed on a stainless steel plate coated with Teflon; a sheet of cation resin placed on the anion resin and a second sheet of Teflon-coated stainless steel placed over the cation resin, care being taken to eliminate folds, creases and bubbles. The sandwich of membranes and plates is heated in a press at about 150° C. and 400 lbs./in.$^2$ for 15 minutes. The resulting structures are immersed in distilled water for 24 hours and if then substantially free of blisters are suitable for use in the apparatus of this invention.

It is found that the internal molality of the cation resins prepared as above will be in the range of 50 to 90 percent of the internal molality of the anion resins.

EXAMPLE II

Alternatively the styrenized 3 mil polyethylene sheets of Example I are mounted on a stainless steel cylinder in the manner previously described and reacted at 50° C. in 98% sulfuric acid (containing 0.1 weight percent silver sulfate). The time of sulfonation is adjusted experimentally until the capacity, electrical resistance and microscopic examination of a cross section dyed with methylene blue indicate that the sulfonation has proceeded through approximately three-quarters of the thickness of the membrane. The time required is generally about three quarters of an hour. The entire frame is then plunged into water at 50° C. to arrest the sulfonation reaction. The sheet is removed and chloromethylated and aminated as described in Example I. Laminar membranes prepared in this way are entirely suitable for the apparatus and process of this invention. Analysis of scrapings taken from the surfaces of the resins shows that the internal molality of the cation surface will be in the range of 50 to 90 percent of the internal molality of the anion resin.

EXAMPLE III

Sheets of reinforced copolymerizates of styrene and divinylbenzene are prepared in the manner described in Example II of U.S. Pat. No. 2,730,768, granted Jan. 17, 1956. The reinforcement is two sheets of a 1.1 ounce woven glass fiber fabric each having a thickness of about 2.5 mils. The monomer mixture consists of 41.5 parts by weight of commercial divinyl benzene, 12.5 parts of styrene, 46 parts of diethyl benzene and 0.4 part of benzoyl peroxide. The mixture is cast around the fabric between glass plates and cured in an oven at 80° C. for 17 hours. The resulting polymerizates are mounted in frames of polypropylene so that only one side of each of the polymerizates is exposed. The frames are immersed in 98% sulfuric acid at room temperature. The required time to sulfonate from $2/3$ to $9/10$ of the membrane is determined as described in Example II. The frames are then quenched in water at the indicated immersion time and after rinsing with methanol and ethylene dichloride, chloromethylated and aminated in the manner described in Example II. Tests on polymerizates which have been wholly sulfonated or wholly aminated show that the internal molality of the cation resin is in the range of 50 to 90 percent of that of the anion resin. Laminar membranes prepared according to this example are entirely suitable for the process and apparatus of this invention.

EXAMPLE IV

An electrodialysis cell is assembled using the membranes of Example I which are cut to a size 9 by 10 inches. Tortuous path spacers of the general type disclosed in U.S. Pat. No. 2,708,658 are used having an active area of about 35.7 square inches, a thickness of 0.040 inch and a path width of 0.25 inch. Turbulence promoting straps are placed in the path every 0.43 inch. The orientation of the membranes alternates so that one set of alternate chambers is bounded by cation resin and the intervening set by anion resin. A synthetic brackish water is prepared which is approximately 0.054 N in $Cl^-$, 0.006 N in $SO^=_4$, 0.049 N in $Na^+$, 0.0085 N in $Mg^{++}$ and 0.0022 N in $Ca^{++}$ and is thus representative of a brackish water formed by intrusion of sea water into fresh water. This solution is pumped at a velocity of about 1.25 feet per second through the tortuous path spacers; the effluents from anion resin bounded chambers being collected separately from the effluent from the cation bounded chambers. A direct current density of about 165 milliamperes per square inch of effective membrane area is applied between the electrodes and through the membranes. The electrodes are platinum plated niobium. A separate electrode solution of 0.06 N $NaH_2PO_4$ is recirculated in parallel through the electrode compartments and adjacent buffer or rinsing compartments. At steady state it is found that the effluent from the compartments bounded by anion resin has been partially demineralized and that bounded by cation resin has become more concentrated. The latter is distinctly acid. By chemical analysis the current efficiency is found to be between 60 and 70 percent.

Without stopping the solution flow, the direction of the electric current is reversed after about 30 minutes and maintained at about 165 amperes per square inch. At steady state it is again found that the effluent from the compartments bounded by anion resin has been partially demineralized and that bounded by cation resin has become more concentrated and is still distinctly acid. By chemical analysis the current efficiency is again found to lie between 60 and 70 percent. The electric current is reversed every half hour and the performance at steady state remains unaltered, that is, the effluent from the anion bounded compartments is partially dimineralized and that from the cation bounded compartments becomes more concentrated. Similar results are obtained with 15-minute cycles. Upon disassembly the stack is found to be substantially free of scale and precipitate.

EXAMPLE V

Membranes prepared according to Example II are placed in the apparatus of Example IV alternating in orientation as in that example. The solution treated is a synthetic brackish water containing about 1 gram each per liter of sodium chloride and calcium sulfate (anhydrous basis). The current density is 60 milliamperes per square inch and the reversal time 15 minutes. It is found that the effluent from anion bounded compartments has been partially demineralized and that from the cation bounded compartments has become more concentrated. The latter is found to be distinctly acid. The current efficiency at steady state in each cycle is found by chemical analysis to be between 50 to 60 percent.

Similar results are obtained using the membranes of Example III. In this case the $NaCl-CaSO_4$ solution is colored by adding tea extract to simulate colloidal matter found in surface waters. Current efficiency remains between 50 and 60 percent and there is no deterioration in performance after several reversal cycles indicating that the apparatus and process are substantially resistant to fouling. In standard electrodialysis apparatus in which reversal is not used, such a simulated surface water would seriously foul the anion selective membranes in a few hours. In addition, it is to be noted that the prior art practice of a simultaneous reversal of the concentrate and dilute stream flow with the reversing of the direction of direct current flow is completely avoided. In the present invention the concentrate and dilute chambers remain the same upon reversal of direction of current regardless of the direction of current flow through the cell.

I claim:

1. Apparatus for the deionization of electrolyte solutions comprising a plurality of alternating diluting and concentrating chambers defined by alternatingly oriented asymmetric ion exchange membranes, one surface of each of said membranes comprising essentially an anion exchanger, the other surface comprising essentially a cation exchanger, said diluting chambers being bounded by the anion exchange surfaces of said membranes, said concentrating chambers being bounded by the cation exchange surfaces of said membranes, electrode chambers outboard of said membranes, means for passing electrolyte solutions through all of said chambers, means for passing direct electric current transversely through said chambers and membranes, and means for periodically reversing the direction of flow of said current through said chambers and membranes.

2. The apparatus of claim 1 wherein the cation exchange resin of said oriented ion exchange membranes has an internal molality substantially less than that of the anion exchange resin of said membrane.

3. The apparatus of claim 2 wherein the internal molality of the cation exchange resin is 10% to 50% less than that of the anion resin.

(References on following page)

References Cited

UNITED STATES PATENTS

| | | | |
|---|---|---|---|
| 2,829,095 | 4/1958 | Oda et al. | 204—98 |
| 2,970,098 | 1/1961 | Ellis | 204—301 |
| 3,227,662 | 1/1966 | Kollsman | 260—2.1 |
| 3,268,433 | 8/1966 | Abere | 204—181 |
| 3,276,989 | 10/1966 | Nishihara et al. | 204—296 |
| 3,276,991 | 10/1966 | Hani et al. | 204—296 |
| 3,510,417 | 5/1970 | Mizutani et al. | 204—180 |
| 3,510,418 | 5/1970 | Mizutani et al. | 204—181 |

JOHN H. MACK, Primary Examiner

A. C. PRESCOTT, Assistant Examiner

U.S. Cl. X.R.

204—180 P